United States Patent

[11] 3,610,865

| [72] | Inventor | Cornelis Van Osenbruggen<br>Emmasingel, Eindhoven, Netherlands |
|---|---|---|
| [21] | Appl. No. | 831,633 |
| [22] | Filed | June 9, 1969 |
| [45] | Patented | Oct. 5, 1971 |
| [73] | Assignee | U.S. Philips Corporation<br>New York, N.Y. |
| [32] | Priority | June 15, 1968 |
| [33] | | Netherlands |
| [31] | | 6,808,468 |

[54] METHOD AND APPARATUS FOR REMOVING MATERIAL BY MEANS OF SPARK EROSION
12 Claims, 2 Drawing Figs.

[52] U.S. Cl. .................................................. 219/69 V,
219/69 G
[51] Int. Cl. ................................................. B23k 9/16
[50] Field of Search ........................................... 219/69 V,
69 G; 310/8.1, 9.8

[56] References Cited
UNITED STATES PATENTS

| 2,841,686 | 7/1958 | Williams | 219/69 G |
| 2,903,556 | 9/1959 | McKechnie | 219/69 V |
| 3,072,777 | 1/1963 | McKechnie | 219/69 V |
| 3,432,691 | 3/1969 | Shoh | 310/8.1 |

Primary Examiner—J. V. Truhe
Assistant Examiner—Hugh D. Jaeger
Attorney—Frank R. Trifari ABSTRACT: An electric discharge machining apparatus utilizing a piezoelectric element having two metal coatings which form a capacitor A voltage is applied to the coatings which causes the piezoelectric element to oscillate, and by controlling the current to the piezoelectric element, the gap distance can be varied. The oscillation frequency is determined by the current supplied and the gap discharge rate.

PATENTED OCT 5 1971    3,610,865

INVENTOR.
CORNELIS VAN OSENBRUGGEN
BY
Frank R. Trifari
AGENT

METHOD AND APPARATUS FOR REMOVING MATERIAL BY MEANS OF SPARK EROSION

The present invention relates to a method for removing material from a conductive workpiece by spark erosion utilizing a piezoelectric element which oscillates relative to the workpiece, sparks being produced between an electrode on the element and the workpiece.

Such a method is known from British Pat. specification No. 1,105,411.

In this known method, a resilient electrode is caused to vibrate relative to a surface of the material to be machined. The amplitude of vibration is chosen so that, relative to the maximum value of the voltage difference developed between the electrode and the surface, a spark discharge occurs between the electrode and the surface. The material is removed only by the erosive effect of the spark discharge.

In this method, a piezoelectric element is preferably used as the member which imparts an oscillating movement to the electrode. This element is caused to oscillate by means of a special square wave generator, a relaxation supply circuit having an RC constant time being connected between the electrode and the workpiece. If the machining of the workpiece requires accurate definition, any contact between the electrode and the workpiece is undesirable. A disadvantage of the known method is that this contact cannot completely be avoided since the minimum spacing between the electrode and the workpiece is determined by a number of factors such as the flatness with which the support of the workpiece moves underneath the electrode, the flatness of the workpiece itself, the reproducibility of the piezoelectric element and the form of its oscillations, the voltage limits of the square wave generator and the mobility of the electrode relative to its mount. The electrode is resiliently mounted, it is true, to prevent the workpiece from being mechanically worked by hammering and also to protect the tip of the electrode, but this requires special guiding means surrounding the electrode to prevent lateral deflection. Another disadvantage of the known method is that the relaxation time of the charging and discharging processes preferably must be equal to the oscillation period of the piezoelectric element.

It is an object of the present invention to obviate the said disadvantages and the invention provides considerable improvement especially in those cases in which a very high degree of machining accuracy is required.

For this purpose, according to the invention, a method of the type set forth in the preamble is characterized in that the piezoelectric element performs a relaxation oscillation having an oscillation period which is determined by the current supplied to a capacitance which is constituted at least by the metal coatings of the piezoelectric element and by the charge which is drained from this capacitance by the spark produced between the electrode and the workpiece.

For carrying out the method in accordance with the invention an apparatus may be used which comprises a support for the workpiece, an electrically driven oscillating piezoelectric element and a voltage supply source having an internal resistance, sparks being produced between an electrode on the element and the workpiece. Such an apparatus is characterized in that the electrode is connected to one of the two metal coatings, the conductive workpiece is connected to the other coating and the voltage supply source which delivers the supply current is connected to both coatings.

Features and advantages of the invention will appear from the following description of an embodiment thereof, given by way of example only, with reference to the accompanying drawing, in which.

Figure 1:
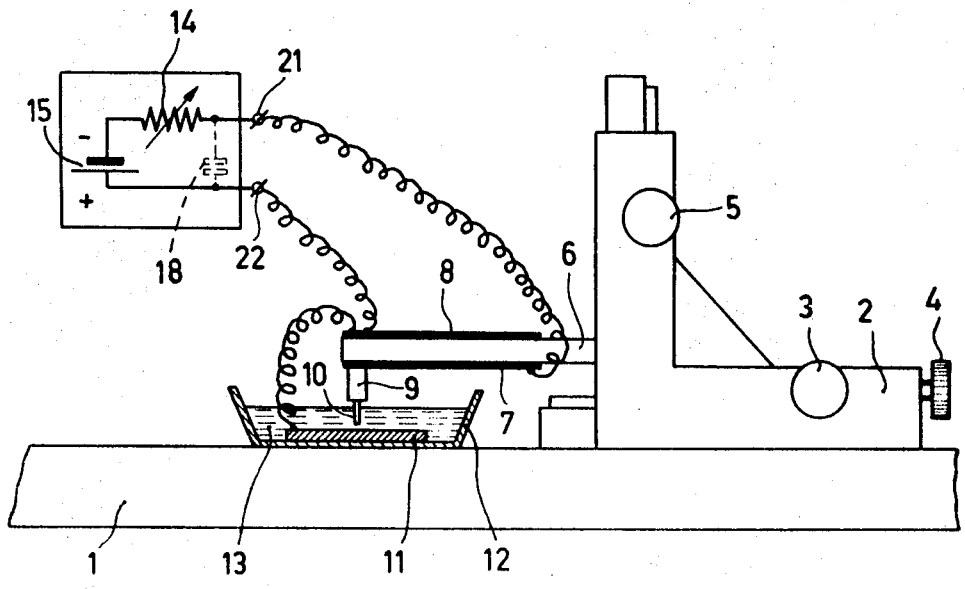
FIG. 1 shows schematically an elevation of an apparatus.

Referring to FIG. 1, there is shown the workpiece to be machined which is in the form of a conductive layer 11 which may be provided on an insulating body.

The workpiece 11 is arranged in a receptacle 12 containing a dielectric liquid 13. The receptacle 12 is placed on a worktable 1.

A piezoelectric element 6 is adjusted at a predetermined height above the conductive layer 11 by means of a rack and pinion 5 arranged in a pillar 2. The pillar 2 is secured on the table 1 and can be displaced in a horizontal plane by means of knobs 3 and 4. The piezoelectric element 6, which in the embodiment shown is a bielement as described in "Electronics", July 19, 1963, page 80, but which may have a design as described in U.S. Pat. No. 2,540,187, FIGS. 1 to 10, so that the free end performs a large movement in a vertical plane when a variable voltage is applied between metal coatings 7 and 8. Near its free end the piezoelectric element carries a holder 9 for an electrode 10. The variable voltage which is set up between the coatings is produced by a charging current supplied by a device having output terminals 21 and 22 and containing a voltage supply source 15 and a resistance 14 which comprises the internal impedance of the source 15 and may include a variable resistor, the voltage causing the piezoelectric element carrying the electrode 10 to move towards the conductive layer 11. This layer electrically connected to the coating 8 and the electrode 10 is electrically connected to the coating 7. When the voltage between the coatings is sufficiently high, the spacing between the electrode 10 and the conductive layer 11 may become small enough to produce a spark between them. The voltage across the capacitance constituted by the coatings is then discharged by way of the spark. As a result the voltage between the coatings largely collapses and the end of the piezoelectric element jumps back. The charging current again raises the voltage across the coating capacitance with the result that the free end of the bielement 6 carrying the electrode 10 again moves towards the conductive layer 11 until a new discharge takes place. Thus, a relaxation oscillation is produced without the electrode coming into mechanical contact with the conductive layer. Consequently, an electrode having a very fine tip will not be damaged and the use of a suitable spark energy enables extremely narrow tracks to be made in surfaces.

A particular advantage of the method in accordance with the invention consists in that tolerances in the flatness with which the workpiece moves underneath the electrodes, which are due to the guide members of the pillar and the lack of flatness of the workpiece itself, are absorbed without the electrode contacting the workpiece. The workpiece may even have a contoured surface.

This influences the spark energy and the oscillation period, however, but these magnitudes may be maintained constant by means of a control device which will be described in more detail hereinafter with reference to FIG. 2 which shows a particular embodiment of the apparatus for carrying out the method.

Each time the breakdown voltage between the electrode and the workpiece is reached the electrode cannot approach closer to the surface of the workpiece because the increasing voltage which caused the electrode to move towards this surface is rapidly reduced by the discharge in the resulting spark to the extinction voltage of the spark. The energy which is released thereby and which ensures the machining of the conductive layer largely depends upon the charged capacitance and on the difference of the squares of the breakdown and extinction voltages. When the capacitance of the element coatings is too small, an additional capacitor 18 may be connected in parallel with the coatings 7 and 8. This may be of advantage in those cases where a higher spark energy must be used, for example, for cutting a deep track.

Furthermore, the initial spacing between the electrode and the surface of the workpiece, i.e. the spacing which exists without a voltage being applied to the piezoelectric element, may be controlled to obtain a lower or a higher breakdown voltage and consequently to control the energy of each individual spark discharge.

The frequency at which the spark occurs and the speed of the electrode relative to, and along, the surface of the machine also determine the penetration depth and the structure of the edges of the track made. If both of the latter magnitudes have to satisfy predetermined requirements, it is desirable for the repetition frequency of the spark to be controllable.

In this event, the charging current must be adjustable and for this purpose the voltage supply circuit 15, 14 must be a variable current supply source capable of supplying an adjustable but constant current, or else the voltage supply source 15 or the internal impedance 14 must be adjustable.

For highly accurate machining the spark energy may still be excessive. To reduce the spark energy, the coating capacitance would have to be greatly reduced. For this purpose, FIG. 2 shows part of the apparatus modified to include an inductance 16 and a capacitor 17 having values of, say, 50 microhenry and 50 picrofarad, respectively. The capacitor 17 is connected to the workpiece 11 and to the electrode 10 and supplies the spark energy for each individual spark discharge.

Between the coating 8 and the workpiece 11 there is connected the inductance 16 through which the charging current of the coating capacitance flows to the capacitor 17 so that this capacitor is periodically charged to the spark breakdown voltage. In this apparatus the energy stored in the coating capacitor is not discharged in a single spark but in a sequence of discharge sparks which occur in so short a time that the piezoelectric element does not change its position. When the workpiece is not level but has a curved outline and tracks must be scored or scribed in it which still must have a certain accuracy or quality, the arrangement according to FIG. 1 may be extended to include a control device which, according to the invention, is characterized by having its input connected to the coating capacitance and its output connected to a device which controls the mean spacing between the piezoelectric element and the workpiece so that the spark energy is maintained substantially constant irrespective of the shape of the surface of the workpiece.

Because the input of the control device is connected to the coating capacitance, the peak voltage across this capacitance can be supervised by peak detection by means of a diode and by comparison of this peak voltage with an adjustable reference voltage. The difference signal may, if required after amplification, be used to control a motor which drives the pinion 5 of FIG. 1 so that the piezoelectric element is maintained substantially at the same mean spacing from the workpiece and hence follows the outline thereof.

Figure 2:
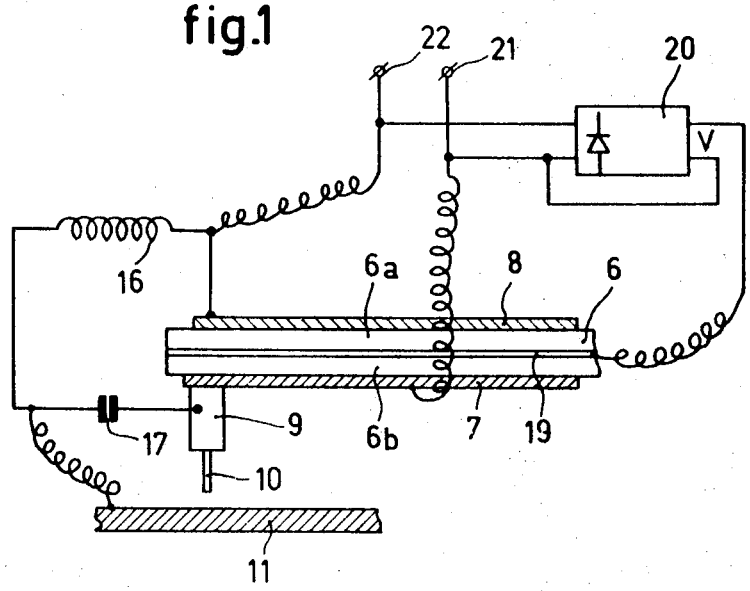
FIG. 2 shows a particular embodiment of part of the apparatus in accordance with the invention.

FIG. 2 shows a particular embodiment of the device which maintains the mean spacing between the electrode and the workpiece constant. A control device 20 is connected to the terminals 21 and 22 and the piezoelectric element 6 is provided not only with the coatings 7 and 8, but also with a central electrode 19 to which is connected one output terminal of the control device 20, the other output terminal being electrically connected to the coating 7. The voltage applied through the terminals 21 and 22 to the coatings 7 and 8 causes a plate 6a of the element 6 to alternately contract and expand longitudinally, whereas a plate 6b responds in the opposite sense, i.e. expands and contracts, so that the electrode 10 moves with respect to the workpiece 11. The output voltage V of the control device 20 is a measure of the deviation of the peak voltage at the terminals 21 and 22 from the reference value and causes the plate 6b to change its length correspondingly so that the mean spacing between the electrode 10 and the workpiece 11 remains constant, irrespective of the lack of flatness or the nonstraight outline of the workpiece.

The advantages of the method and the device in accordance with the invention will be particularly manifest when an optical grating is to be made. This optical grating comprises a transparent support for a thin opaque electrically conductive layer. Parts of the latter layer must be removed so that light will be passed. The tracks which must be scored in the layer for this purpose may have a width of less than 10 microns, as may their spacings. By means of the device described a satisfactory nonfrayed edge structure having the required widths and spacings is simply obtainable.

What is claimed is:

1. A method of removing material from a conductive workpiece by spark erosion comprising the steps of causing a piezoelectric element on which an electrode is mounted and having two metal coatings forming a capacitance to perform oscillations relative to the workpiece, said two metal coatings being connected to said electrode and to the workpiece, respectively, applying a voltage to the capacitance coatings so that sparks are produced between said electrode and the workpiece while the piezoelectric element oscillates, the oscillation period of the piezoelectric element being determined by the current supplied to said capacitance coatings and by the discharge of said capacitance via the spark produced between the electrode and the workpiece.

2. A method as claimed in claim 1 further comprising the step of adjusting the mean spacing between the piezoelectric element and the workpiece while the element oscillates as a function of the peak voltage across the capacitance coatings so as to maintain the spark energy substantially constant.

3. Spark erosion apparatus for removing material from a conductive workpiece comprising, a support for the workpiece, a piezoelectric element having an electrode mounted thereon and supported adjacent to the workpiece to permit oscillation, said element having two metal coatings thereon to form a capacitance therebetween which controls the deflection of the element as a function of the voltage thereon so as to move the electrode into a predetermined position relative to the workpiece to form a gap with the workpiece across which sparks can be produced, means electrically connecting said electrode to a first one of said metal coatings and said workpiece to the other metal coating, and a source of voltage having an internal impedance connected to said metal coatings to cause the piezoelectric element to perform relaxation oscillations, the oscillation period of said element being determined by the current supplied to the capacitance formed by the metal coatings and by the discharge of said capacitance via the spark produced between the electrode and workpiece.

4. An apparatus as claimed in claim 3 further comprising a control device having an input and an output, means for controlling the mean spacing between the piezoelectric element and the workpiece, means connecting the input of the control device to the metal-coating capacitance and the output to said controlling means so that said controlling means maintains the mean spacing between the piezoelectric element and the workpiece constant irrespective of the workpiece contour.

5. An apparatus as claimed in claim 3 further comprising a control device having an input and an output, said piezoelectric element comprising two plates of piezoelectric material sandwiching a central electrode therebetween, said metal coatings being mounted on said piezoelectric plates, said voltage source including means producing an alternating voltage across the metal coatings to cause one plate to alternately expand and contract longitudinally and the other plate to simultaneously alternately contract and expand, means connecting the input of the control device to the metal-coating capacitance and the output across said central electrode and one metal coating to apply a voltage thereto which maintains the mean spacing between the piezoelectric element and the workpiece substantially constant.

6. An apparatus as claimed in claim 7 further comprising a capacitor connected in parallel with the metal coatings.

7. An apparatus as claimed in claim 7 further comprising a capacitor connected between said electrode and the workpiece, and said electrical-connecting means includes an inductor connected between the workpiece and said other metal coating to form a closed loop series circuit that includes the capacitor, the inductor and said two metal coatings.

8. An apparatus as claimed in claim 7 further comprising a capacitor connected between the electrode and the workpiece and an inductance connected in the series circuit of the capacitor and the electrode.

9. Spark erosion apparatus for removing material from a conductive workpiece comprising, a support for the workpiece, a piezoelectric element having two metal coatings thereon to form a capacitance therebetween and mounted adjacent the workpiece to permit oscillation relative thereto, an electrode mounted on said piezoelectric element to form a gap with the workpiece across which sparks can be produced, means electrically connecting said electrode to a first one of said metal coatings and said workpiece to the other metal coating, and a source of voltage having an internal impedance connected to said metal coatings to cause the piezoelectric element to perform relaxation oscillations, said voltage source including means for adjusting the amplitude of the charge current supplied to said metal-coating capacitance, the oscillation period of said element being determined by the current supplied to the capacitance formed by the metal coatings and by the discharge of said capacitance via the spark produced between the electrode and workpiece.

10. Spark erosion apparatus for removing material from a conductive workpiece comprising, a support for the workpiece, a piezoelectric element mounted to permit oscillation and supporting an electrode adjacent to the workpiece to form a gap therewith to develop sparks, and means for controlling the mean spacing between the electrode and workpiece during oscillation of said element comprising, two metal coatings mounted on the piezoelectric element to form a capacitance for the storage of spark energy, means electrically connecting said electrode to a first one of said metal coatings and said workpiece to the other metal coating, a source of direct voltage having an internal impedance, means connecting said voltage source to said metal coatings to charge the capacitance and deflect the piezoelectric element over a distance proportional to the voltage whereby a spark is produced across the gap to at least partially discharge the capacitance and produce relaxation oscillations of the piezoelectric element, the oscillation frequency of said element being determined solely by the current supplied to the capacitance formed by the metal coatings and by the discharge of said capacitance via the spark produced between the electrode and workpiece.

11. An apparatus as claimed in claim 10 wherein said piezoelectric element comprises an elongated member rigidly mounted at one end with the other end free to vibrate, said electrode being mounted on the free end of said element.

12. An apparatus as claimed in claim 10 further comprising means for adjusting the initial spacing between electrode and workpiece to control the energy delivered by each spark discharge.